United States Patent
Matsui et al.

(10) Patent No.: US 9,554,076 B2
(45) Date of Patent: Jan. 24, 2017

(54) SYSTEM, INFORMATION PROCESSING APPARATUS, AND IMAGE PROCESSING METHOD

(71) Applicant: FUJITSU LIMITED, Kawasaki-shi, Kanagawa (JP)

(72) Inventors: Kazuki Matsui, Kawasaki (JP); Kenichi Horio, Yokohama (JP); Tomoharu Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 9 days.

(21) Appl. No.: 14/663,191

(22) Filed: Mar. 19, 2015

(65) Prior Publication Data

US 2015/0195475 A1    Jul. 9, 2015

Related U.S. Application Data

(63) Continuation of application No. PCT/JP2012/074808, filed on Sep. 26, 2012.

(51) Int. Cl.
*G06K 9/46* (2006.01)
*H04N 5/44* (2011.01)
(Continued)

(52) U.S. Cl.
CPC ............. *H04N 5/44* (2013.01); *G06T 7/0079* (2013.01); *H04N 21/2343* (2013.01);
(Continued)

(58) Field of Classification Search
CPC .......... G06T 7/0079; G06T 7/00; H04N 5/44; H04N 21/2402; H04N 21/41407; H04N 21/2343; H04N 21/8153; H04N 2201/008; G09G 2350/00; G09G 2340/02; G09G 2340/125; G09G 2370/022; G09G 2370/20; G06F 3/1438; G06F 3/1454; G06F 3/1462
(Continued)

(56) References Cited

U.S. PATENT DOCUMENTS

2002/0102987 A1* 8/2002 Souisse .................. H04L 25/14 455/454
2005/0165918 A1* 7/2005 Wantanabe ............ H04N 5/782 709/223
(Continued)

FOREIGN PATENT DOCUMENTS

JP    03-282745    12/1991
JP    2002-268998    9/2002
(Continued)

OTHER PUBLICATIONS

Japanese Office Action dated Mar. 8, 2016 in corresponding Japanese Patent Application No. 2014-537936.
(Continued)

*Primary Examiner* — Ali Bayat

(57) ABSTRACT

A system includes an information processing apparatus and a terminal apparatus connected via a network. The information processing apparatus includes a processor that calculates based on image data of an image to be displayed on a display screen of the terminal apparatus and a compression rate of the image data, a data transfer volume to be transmitted to the terminal apparatus, and determines based on the calculated data transfer volume and a data transfer rate with the terminal apparatus, a segmentation unit by which the image is segmented.

9 Claims, 12 Drawing Sheets

(51) Int. Cl.
*G06T 7/00* (2006.01)
*H04N 21/2343* (2011.01)
*H04N 21/24* (2011.01)
*H04N 21/414* (2011.01)
*H04N 21/81* (2011.01)

(52) U.S. Cl.
CPC ... *H04N 21/2402* (2013.01); *H04N 21/41407* (2013.01); *H04N 21/8153* (2013.01); *H04N 2201/0008* (2013.01)

(58) Field of Classification Search
USPC .......................................................... 382/232
See application file for complete search history.

(56) References Cited

U.S. PATENT DOCUMENTS

| | | | |
|---|---|---|---|
| 2008/0150952 A1 | 6/2008 | Koarai | |
| 2009/0210551 A1* | 8/2009 | Oishi | H04N 7/17318 709/231 |
| 2010/0268694 A1 | 10/2010 | Denoue et al. | |
| 2010/0303146 A1* | 12/2010 | Kamay | H04N 21/2343 375/240.02 |
| 2010/0322523 A1* | 12/2010 | Mitsuhashi | H04N 19/63 382/218 |
| 2011/0173266 A1 | 7/2011 | Ohashi et al. | |
| 2011/0276653 A1 | 11/2011 | Matsui et al. | |
| 2012/0218292 A1* | 8/2012 | Nyczyk | G06F 3/1462 345/629 |
| 2014/0119648 A1* | 5/2014 | Park | H04N 21/43637 382/166 |

FOREIGN PATENT DOCUMENTS

| | | |
|---|---|---|
| JP | 2008-139981 | 6/2008 |
| JP | 2009-181460 | 8/2009 |
| JP | 2010-004353 | 1/2010 |
| JP | 2010-257228 | 11/2010 |
| JP | 2011-018314 | 1/2011 |
| JP | 2011-238014 | 11/2011 |
| JP | 2012-065314 | 3/2012 |
| WO | WO 2009/004996 A1 | 1/2009 |
| WO | 2010/032301 A1 | 3/2010 |

OTHER PUBLICATIONS

International Search Report mailed Dec. 4, 2012 in corresponding international application PCT/JP2012/074808.
International Preliminary Report on Patentability mailed Dec. 4, 2012 in corresponding international application PCT/JP2012/074808.
Japanese Office Action dated Aug. 30, 2016 in corresponding Japanese Patent Application No. 2014-537936.

* cited by examiner

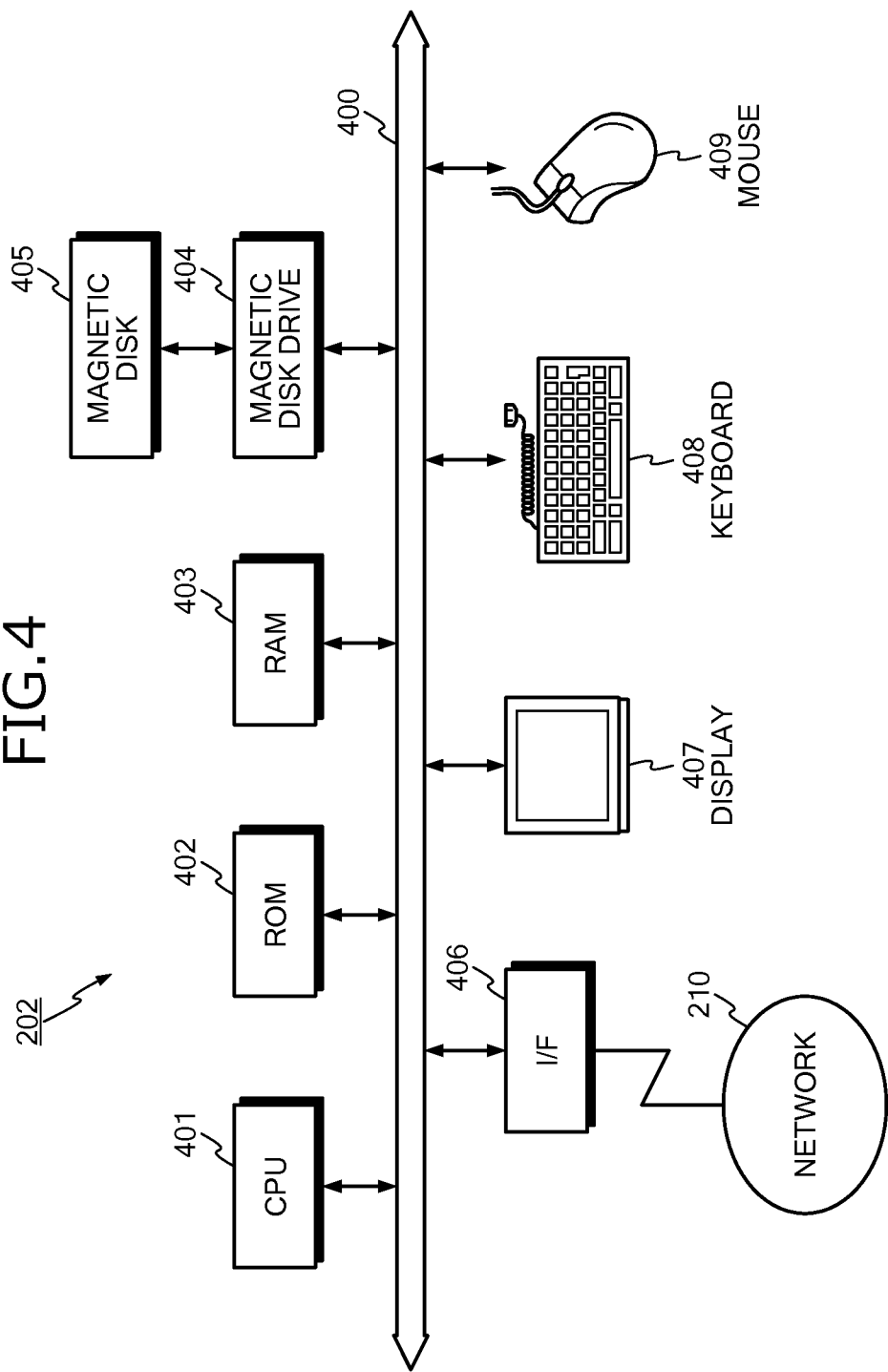

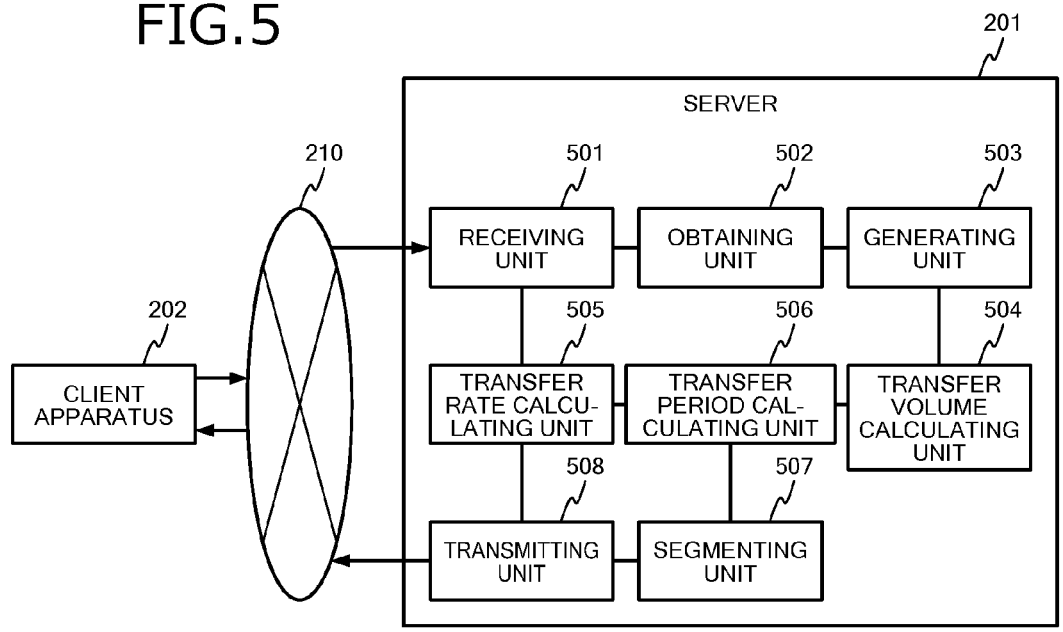
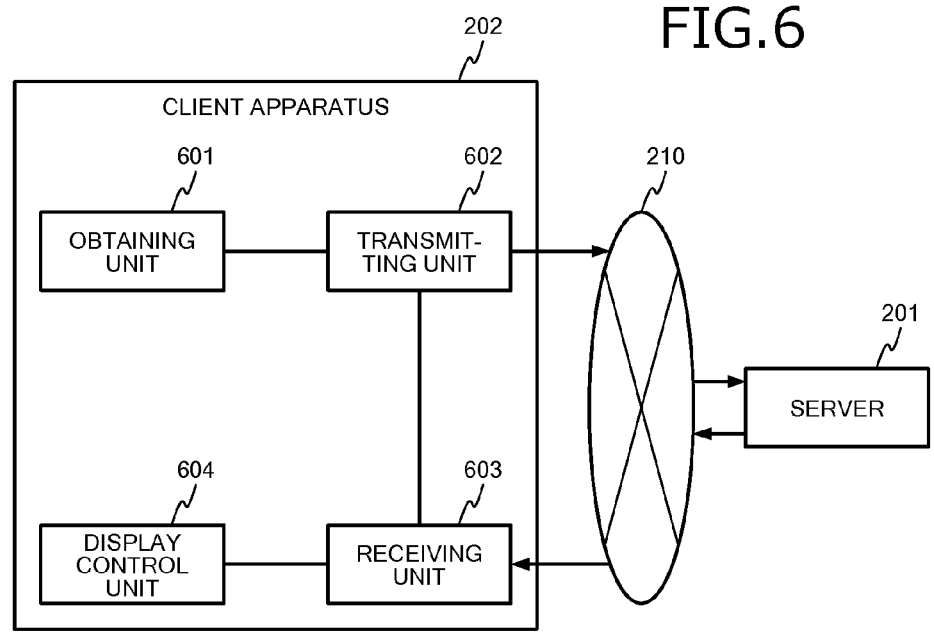

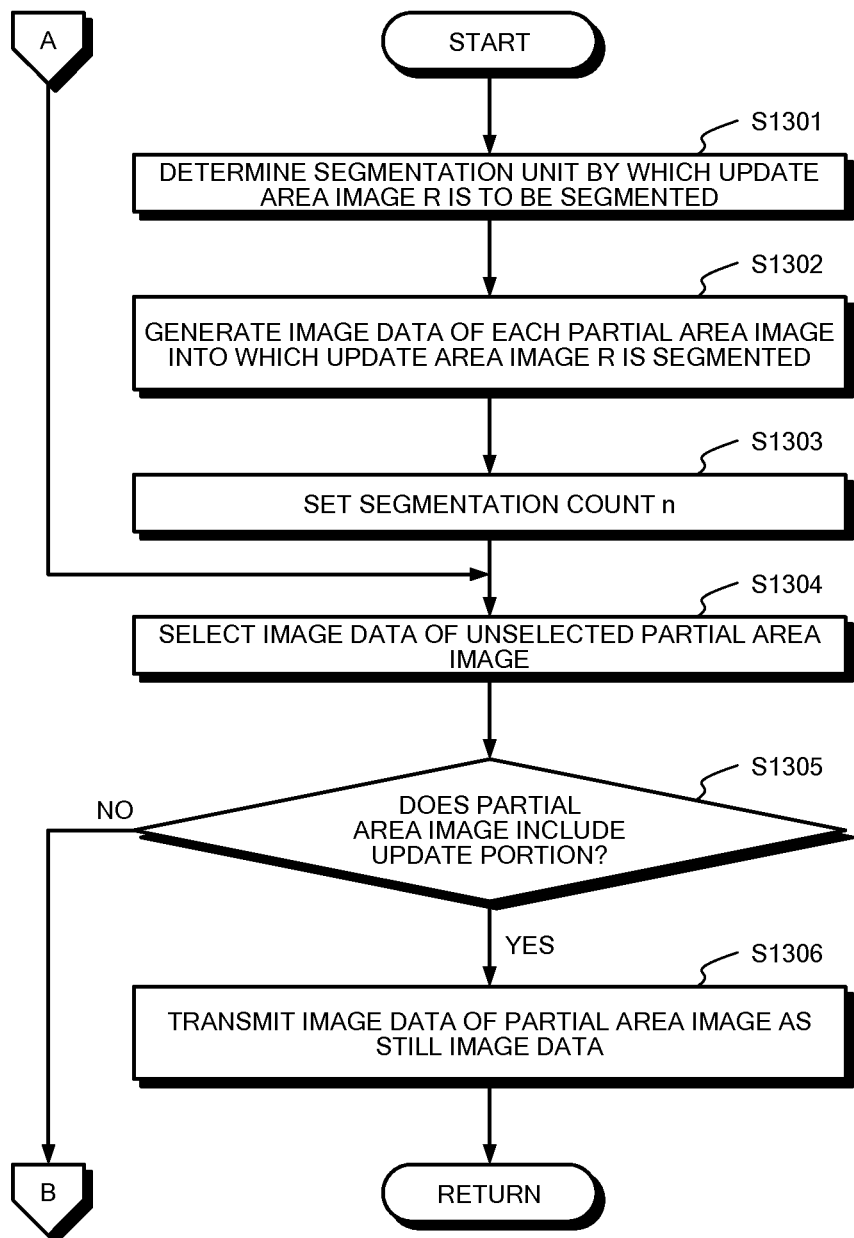

SYSTEM, INFORMATION PROCESSING APPARATUS, AND IMAGE PROCESSING METHOD

CROSS REFERENCE TO RELATED APPLICATIONS

This application is a continuation application of International Application PCT/JP2012/074808, filed on Sep. 26, 2012 and designating the U.S., the entire contents of which are incorporated herein by reference.

FIELD

The embodiments discussed herein are related to a system, an information processing apparatus, and an image processing method.

BACKGROUND

A thin client system is a system that manages applications and data by a server, while the client is provided with minimal functions. Further, accompanying the prevalence of terminal apparatuses such as tablet terminals and smartphones, the need for a so-called mobile thin client system enabling secure use of corporate applications and data in a mobile environment is expanding.

For example, according to a related technique, a webpage displayed by a first computer system is shared with a second computer system. Further, according to another technique, for the same data request from multiple terminals, the amount of data provided differs according to terminal, based on network performance between the server and the terminal. For examples of such techniques, refer to Japanese Laid-Open Patent Publication Nos. 2011-18314 and 2002-268998.

Nonetheless, with the conventional techniques, when a thin client system is used by a terminal apparatus such as a tablet terminal, the network bandwidth is narrow and thus, the communication state with the server easily becomes unstable, arising in a problem in that user operability of the terminal apparatus drops.

SUMMARY

According to an aspect of an embodiment, a system includes an information processing apparatus and a terminal apparatus connected via a network. The information processing apparatus includes a processor that calculates based on image data of an image to be displayed on a display screen of the terminal apparatus and a compression rate of the image data, a data transfer volume to be transmitted to the terminal apparatus, and determines based on the calculated data transfer volume and a data transfer rate with the terminal apparatus, a segmentation unit by which the image is segmented.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a block diagram depicting an example of hardware configuration of a client apparatus 202;

FIG. 5 is a block diagram depicting an example of a functional configuration of the server 201;

FIG. 6 is a block diagram depicting an example of a functional configuration of the client apparatus 202;

FIG. 13 is a flowchart depicting a procedure of partial area image processing.

DESCRIPTION OF EMBODIMENTS

Embodiments of a system, an information processing apparatus, and an image processing method will be described in detail with reference to the accompanying drawings.

Figure 1:
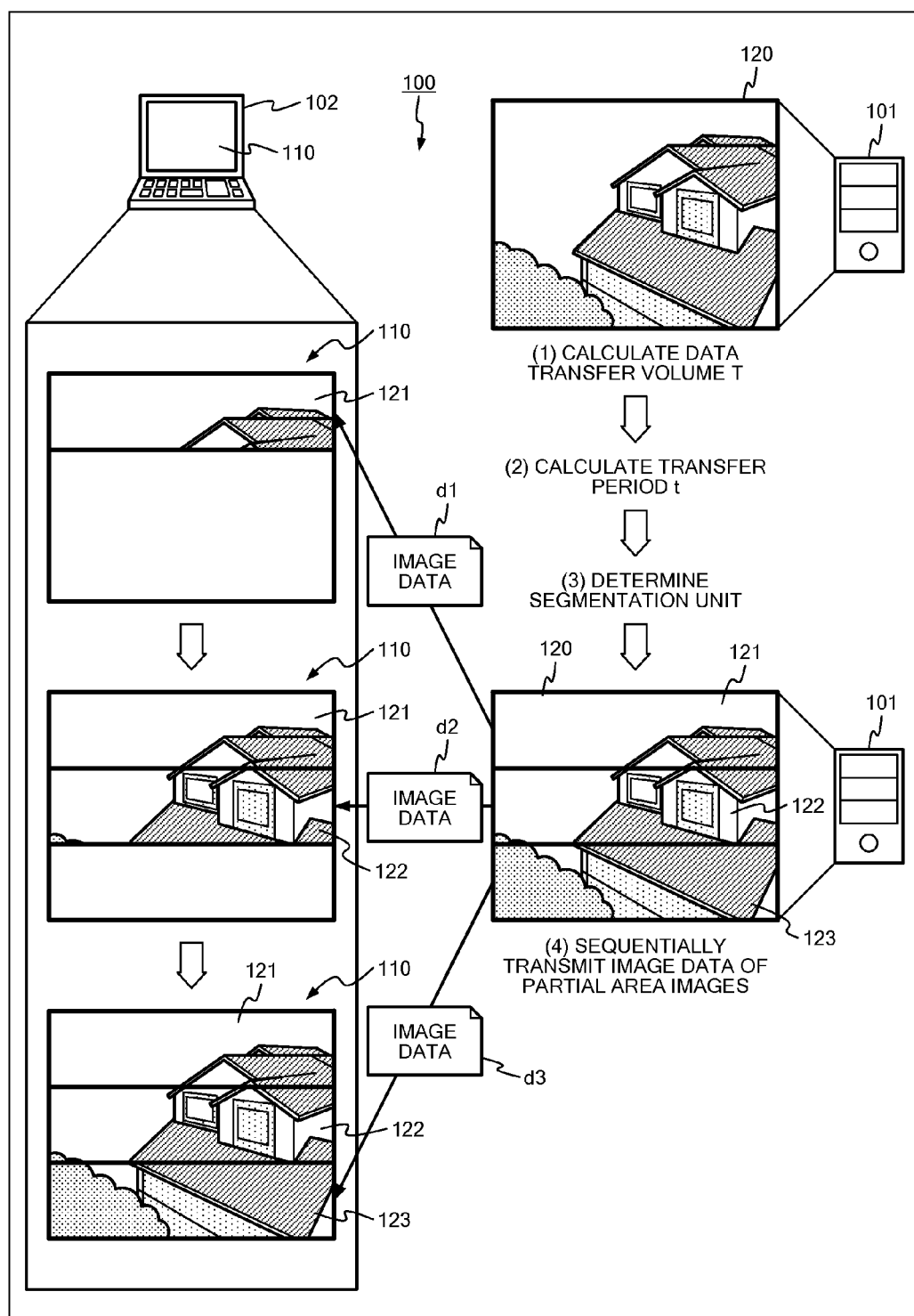
FIG. 1 is a diagram depicting an example of an image processing method according to an embodiment.

FIG. 1 is a diagram depicting an example of an image processing method according to an embodiment. In FIG. 1, a system 100 includes an information processing apparatus 101 and a terminal apparatus 102. The system 100, for example, is a thin client system that manages applications and data by the information processing apparatus 101, while the terminal apparatus 102 is provided with minimal functions.

The information processing apparatus 101 is a computer configured to enable communication with the terminal apparatus 102, via a network. Further, the information processing apparatus 101 has a function of generating image data of an image to be displayed on a display screen 110 of the terminal apparatus 102, and transmitting the image data to the terminal apparatus 102. The information processing apparatus 101 is, for example, a server.

The image is, for example, an image for a screen that displays the execution result of an application executed by the information processing apparatus 101 in response to a request from the terminal apparatus 102. The application is, for example, a design support tool, presentation software, spreadsheet software, e-mail software, and the like. The image data is, for example, product catalog data, computer-aided design (CAD) data used for technical drawing, etc.

The terminal apparatus 102 is a computer configured to enable communication with the information processing apparatus 101, via a network. Further, the terminal apparatus 102 has the display screen 110, and a function of displaying an image on the display screen 110, based on image data received from the information processing apparatus 101. The terminal apparatus 102 is, for example, a tablet terminal, a notebook personal computer (PC), a smartphone, mobile telephone, and the like.

Here, if the thin client system is used by a tablet terminal or a notebook PC, etc., the network bandwidth is narrow and thus, the communication state with the server easily becomes unstable, whereby user operability of the tablet terminal or notebook PC may drop. For example, data transfer from the server to the tablet terminal consumes time, whereby the response to an operation at the tablet terminal may become poor.

Further, although reducing the image quality to reduce the data volume and thereby, reduce the transfer period of the image data may be considered, for example, when images requiring precision such as CAD data used for design and technical drawing are handled, reductions in quality may pose a problem with design and/or technical drawing. Therefore, reducing the quality to adjust the transfer period of image data is difficult.

Further, to enable continued operation on the terminal side in cases where communication with the server is temporarily lost, after data and/or an application is downloaded from the server and executed on the terminal side, deletion of the data and/or application on the terminal side may be consider. However, if the data size of the data and/or application is large, downloading consumes a great amount of time and any data or application remaining on the terminal side, even just temporarily, is undesirable from the perspective of security.

Thus, in the present embodiment, when updating the screen in response to a user operation performed at the terminal apparatus 102, the information processing apparatus 101 segments the image by a segmentation unit that is based on the data transfer volume and the data transfer rate of transmission to the display screen 110, and sequentially transmits the segments to the terminal apparatus 102. As a result, corresponding to the network environment, a response period is secured that does not cause elicit an unpleasant emotion in the user, and operability is improved.

Hereinafter, an example of image processing will be described taking a case where an image 120 is displayed on the display screen 110 of the terminal apparatus 102 in response to user operation input performed at the terminal apparatus 102.

(1) Based on image data of the image 120 displayed on the display screen 110 of the terminal apparatus 102 and a compression rate c of the image data of the image 120, the information processing apparatus 101 calculates a data transfer volume T to be transmitted to the terminal apparatus 102. Here, the compression rate c represents, for example, a ratio of the data volume before and after compression of the image data.

More specifically, for example, the information processing apparatus 101 multiplies the data volume of the image data of the image 120 and the compression rate c to calculate the data transfer volume T to be transmitted to the terminal apparatus 102. For example, the data volume of the image data of the image 120 is assumed to be "375 [Mbytes]" and the compression rate c is assumed to be "0.1 (=10 [%])". In this case, the data transfer volume T to be transmitted to the terminal apparatus 102 is "375 [Kbyte]".

(2) Based on the data transfer volume T and a data transfer rate K, the information processing apparatus 101 calculates a transfer period t for the image data of the image 120. Here, the data transfer rate K is, for example, the average data volume that can be transmitted from the information processing apparatus 101 to the terminal apparatus 102, per unit time. The data transfer rate K may be a preset initial value, or may be measured by communication of the information processing apparatus 101 with the terminal apparatus 102.

More specifically, for example, the information processing apparatus 101 can calculate the transfer period t by dividing the data transfer volume T by the data transfer rate K. For example, the data transfer rate K is assumed to be "10 [Mbps]". In this case, the data volume that can be sent in 100 [msec] is 125 [Kbyte] and the transfer period t is "300 [msec]".

(3) Based on the transfer period t for the image data of the image 120, the information processing apparatus 101 determines the segmentation unit by which the image 120 to be segmented. Here, the segmentation unit is the unit by which the image 120 is segmented and, for example, is represented by the area (pixel count) or data volume of a partial area image segmented from the image 120.

More specifically, for example, when the transfer period t for the image data the image 120 is greater than a threshold X, the information processing apparatus 101 determines the segmentation unit such that the transfer period t for image data of a partial area image segmented from the image 120 becomes less than the threshold X.

Here, the threshold X is, for example, a value representing the response period from the user operation input until a response is returned for the operation input. The threshold X, for example, is set to be a value (for example, several hundred milliseconds) such that if the response period exceeds the threshold X, an unpleasant emotion may be elicited in the user.

For example, the threshold X is assumed to be "100 [msec]", and the transfer period t (300 [msec]) of the image data of the image 120 is assumed to exceed the threshold X. In this case, the information processing apparatus 101, for example, determines the segmentation unit by which the image 120 is segmented, to be "125 [Kbyte]" such that the transfer period t for the image data of the partial area image segmented from the image 120 becomes the threshold X or less.

(4) The information processing apparatus 101 sequentially transmits to the terminal apparatus 102, image data of the partial area images into which the image 120 is segmented by the determined segmentation unit. In the example depicted in FIG. 1, the information processing apparatus 101 sequentially transmits to the terminal apparatus 102, image data d1, d2, and d3 respectively of partial area images 121, 122, and 123 into which the image 120 has been segmented by a unit of 125 [Kbyte].

More specifically, for example, the information processing apparatus 101 transmits the image data d1 of the partial area image 121 to the terminal apparatus 102. Subsequently, at the timing when the image data d1 reaches the terminal apparatus 102, for example, after 100 [msec] has elapsed since the transmission of the image data d1, the information processing apparatus 101 transmits the image data d2 of the partial area image 122 to the terminal apparatus 102.

Similarly, at the timing when the image data d2 reaches the terminal apparatus 102, the information processing apparatus 101 transmits the image data d3 of the partial area image 123 to the terminal apparatus 102. As a result, at the terminal apparatus 102, the partial area images 121, 122, and 123 segmented from the image 120 are sequentially displayed on the display screen 110.

Thus, the information processing apparatus 101 enables dynamic variation of the segmentation unit for the image 120 displayed on the display screen 110 of the terminal apparatus 102, based on the data transfer rate K, which represents network performance, and the data transfer volume T transmitted to the terminal apparatus 102. More specifically, for example, the information processing apparatus 101 enables the segmentation unit by which the image 120 is segmented to be determined such that the transfer period t for the image data of the partial area images into which the image 120 has been segmented does not exceed the threshold X.

As a result, the terminal apparatus 102 can sequentially display the image data d1 to d3 of the partial area images 121 to 123 on the display screen 110 such that the updating interval at which the display contents of the display screen 110 are updated does not exceed the threshold X. As a result, response to user operation input is sooner, enabling drops in user operability to be prevented.

A case where the system 100 depicted in FIG. 1 is applied to a thin client system will be described.

Figure 2:
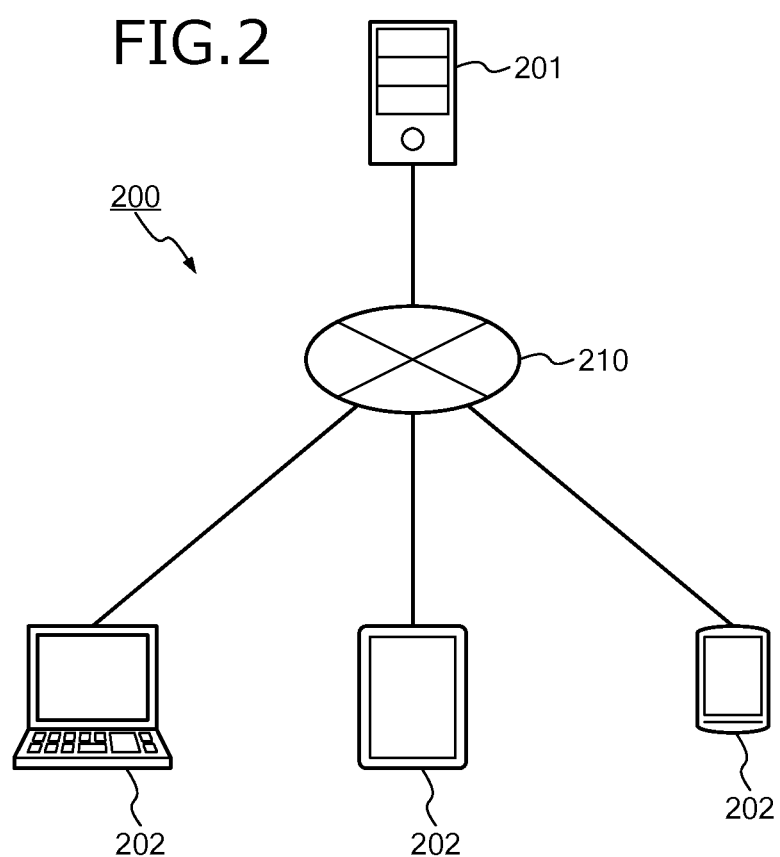
FIG. 2 is a diagram depicting an example of system configuration of a thin client system 200.

FIG. 2 is a diagram depicting an example of system configuration of a thin client system 200. In FIG. 2, the thin client system 200 includes a server 201 and plural client apparatuses 202 (in the example depicted in FIG. 2, three apparatuses). In the thin client system 200, the server 201 and the client apparatus 202 are connected, via a network 210, enabling communication. The network 210 is, for example, a mobile object communications network (mobile telephone network), the Internet, etc.

By the server 201, the thin client system 200 remotely controls the screen displayed by the client apparatus 202. The thin client system 200 enables results of processing actually executed by the server 201 and data retained by the server 201 to be displayed by the client apparatus 202 as if the client apparatus 202 executed the processing and retains the data.

The server 201 is a computer that provides a remote screen control service of remotely controlling the screen displayed by the client apparatus 202. The server 201 corresponds to the information processing apparatus 101 depicted in FIG. 1. The client apparatus 202 is a computer that receives the remote screen control service provided by the server 201. The client apparatus 202 corresponds to the terminal apparatus 102 depicted in FIG. 1.

Figure 3:
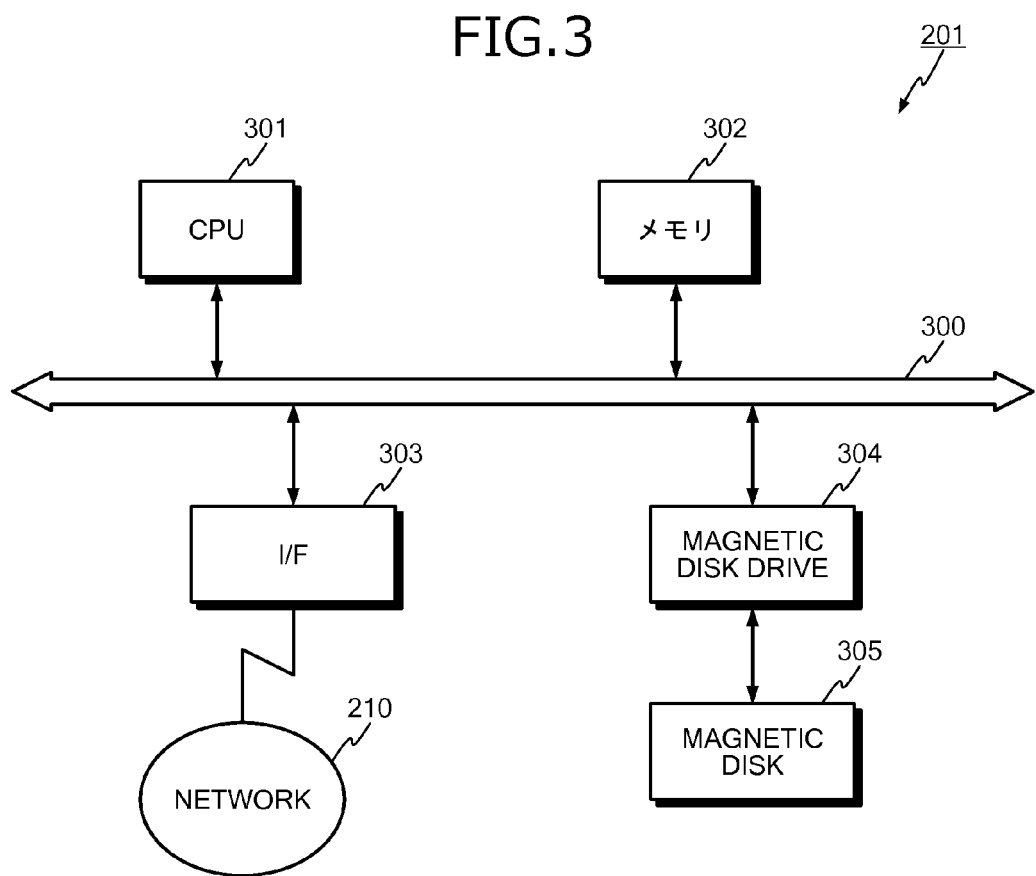
FIG. 3 is a block diagram depicting an example of hardware configuration of a server 201.

FIG. 3 is a block diagram depicting an example of hardware configuration of the server 201. In FIG. 3, the server 201 has a central processing unit (CPU) 301, memory 302, an interface (I/F) 303, magnetic disk drive 304, and a magnetic disk 305, respectively connected by a bus 300.

The CPU 301 governs overall control of the server 201. The memory 302, for example, includes read-only memory (ROM), random access memory (RAM), and flash ROM. More specifically, for example, the flash ROM and ROM store various types of programs, and the RAM is used as work area of the CPU 301. Programs stored in the memory 302 are loaded onto the CPU 301, whereby coded processes are executed by the CPU 301.

The I/F 303 is connected to the network 210, via a communications line, and is connected to other computers (for example, the client apparatus 202) via the network 210. The I/F 303 administers an internal interface with the network 210, and controls the input and output of data with respect to other computers. A model or LAN adapter may be employed as the I/F 303.

The magnetic disk drive 304, under the control of the CPU 301, controls the reading and writing of data with respect to the magnetic disk 305. The magnetic disk 305 stores data written thereto under the control of the magnetic disk drive 304. The server 201 may have, for example, a solid state drive (SSD), a keyboard, a display, etc., in addition to the components above.

FIG. 4 is a block diagram depicting an example of hardware configuration of the client apparatus 202. In FIG. 4, the client apparatus 202 has a CPU 401, ROM 402, RAM 403, a magnetic disk drive 404, a magnetic disk 405, an I/F 406, a display 407, a keyboard 408, and a mouse 409, respectively connected by a bus 400.

The CPU 401 governs overall control of the client apparatus 202. The ROM 402 stores programs such as a boot program. The RAM 403 is used as a work area of the CPU 401. The magnetic disk drive 404, under the control of the CPU 401, controls the reading and writing of data with respect to the magnetic disk 405. The magnetic disk 405 stores data written thereto under the control of the magnetic disk drive 404.

The I/F 406 is connected to the network 210, via a communications line, and is connected to other computers (for example, the server 201) via the network 210. The I/F 406 administers an internal interface with the network 210, and controls the input and output of data with respect to other computers.

The display 407 displays data such as documents, images, and functional information in addition to a cursor, icons, and toolboxes. A thin-film transistor (TFT) liquid crystal display, a plasma display, etc., for example, may be employed as the display 407.

The keyboard 408 has keys for inputting data such as text, numerals, various instructions, etc. Further, the keyboard 408 may be a touch-panel input pad or numeric key pad. The mouse 409 moves the cursor and selects ranges, as well as moves and changes the sizes of windows.

FIG. 5 is a block diagram depicting an example of a functional configuration of the server 201. In FIG. 5, the server 201 includes a receiving unit 501, an obtaining unit 502, a generating unit 503, a transfer volume calculating unit 504, a transfer rate calculating unit 505, a transfer period calculating unit 506, a segmenting unit 507, and a transmitting unit 508. The receiving unit 501 to the transmitting unit 508 are functions forming a control unit. More specifically, for example, the functions are realized by executing on the CPU 301, programs stored in a storage apparatus such as the memory 302 and the magnetic disk 305 depicted in FIG. 3, or by the I/F 303. Processing results of the functional units, for example, are stored a storage apparatus such as the memory 302, the magnetic disk 305, and the like.

The receiving unit 501 has a function of receiving operation information from the client apparatus 202. Here, the operation information is information indicating operation input by the user via the keyboard 408 (refer to FIG. 4) and/or the mouse 409 (refer to FIG. 4) of the client apparatus 202.

The operation information includes, for example, information indicating the type of operation input such as clicks, double-clicks, drag&drops, etc. using the keyboard 408 and/or the mouse 409, and the position of the mouse pointer when the operation input is performed. Further, the operation information may include information that indicates that operation input has ended, information that represents the amount of rotation of a wheel of the mouse 409, key strokes of the keyboard 408, and the like.

The obtaining unit 502 has a function of obtaining based on the operation information received by the receiving unit 501, image data of an image P to be displayed on a display screen S of the client apparatus 202. Here, the display screen S, for example, may be the entire desktop screen displayed by the display 407 of the client apparatus 202, or may be a window in the desktop screen.

More specifically, for example, in response to a request from the client apparatus 202, the obtaining unit 502 notifies the application under execution of the operation information and thereby, obtains the image data of the image P stored in a frame buffer. The frame buffer is a storage area that temporarily stores image data of one frame to be displayed on the display screen S and, for example, is video RAM (VRAM). The frame buffer is, for example, realized by a storage apparatus such as the memory 302, the magnetic disk 305, and the like.

The generating unit 503 has a function of judging based on the image data of the image P and the image data of image $P_{pre}$, whether the display contents of the display screen S have been updated. Here, the image $P_{pre}$ is an image 1-frame before the image P to be displayed on the display screen S. More specifically, for example, when a difference between the image data of the image P and the image data of the image $P_{pre}$ is present, the generating unit 503 judges that the display contents of the display screen S have been updated.

The image data of the image $P_{pre}$ is stored to a pushout buffer. For example, the image data of the image $P_{pre}$ is pushed out from the frame buffer and saved in the pushout buffer, when image data of the image P is stored to the frame buffer. The pushout buffer is, for example, realized by a storage apparatus such as the memory 302, the magnetic disk 305, and the like.

Further, when the display contents of the display screen S are updated, the generating unit 503 generates image data of an update area image R of the image P. Here, the update area image is an image representing an update area in the image P. More specifically, for example, the generating unit 503 generates the image data of the update area image R, for the update area image R as a rectangular area that includes an area image of the image P, differing from the image $P_{pre}$.

The transfer volume calculating unit 504 has a function of calculating the data transfer volume T to be transmitted to the client apparatus 202, based on the image data of the update area image R and the compression rate c of the image data of the update area image R. More specifically, for example, the transfer volume calculating unit 504 selects a compression scheme for compressing the image data of the update area image R.

The compression scheme, for example, may be Joint Photographic Experts Group (JPEG), Graphic Interchange Format (GIF), or Portable Network Graphics (PNG), when the image data is a still image. Further, when the image data is a moving picture, the compression scheme may be Moving Picture Experts Group (MPEG).

More specifically, for example, based on pixel values of the image data of the update area image R, the transfer volume calculating unit 504 selects a compression scheme having the highest compression among plural compression schemes. A pixel value, for example, is the luminance of the red, green, and blue pixels, respectively. The transfer volume calculating unit 504, for example, calculates the data transfer volume T by multiplying the data volume of the image data of the update area image R and the compression rate c of the selected compression scheme.

The transfer rate calculating unit 505 has a function of calculating the data transfer rate K between the server 201 and the client apparatus 202. More specifically, for example, the transfer rate calculating unit 505 calculates the data transfer rate K based on a transmission time when given data is transmitted to the client apparatus 202, a reception time when the given data is received by the client apparatus 202, and the data volume of the given data.

More specifically, for example, the transfer rate calculating unit 505 divides the data volume of the given data by the time interval of the transmission time and reception time of the given data and thereby, calculates the data transfer rate K at which transmission to the client apparatus 202 is possible per unit time. The given data may be data dedicated for measuring the data transfer rate K, or may be the image P displayed on the display screen S, the image data of the update area image R, etc.

The transfer period calculating unit 506 has a function of calculating the transfer period t for the image data of the update area image R. Here, the transfer period t for the image data of the update area image R is the time consumed for transferring the image data from the server 201 to the client apparatus 202. More specifically, for example, the transfer period calculating unit 506 divides the data transfer volume T by the data transfer rate K and thereby, calculates the transfer period t for the image data of the update area image R.

The segmenting unit 507 has a function of determining based on the transfer period t for the image data of the update area image R, the segmentation unit for segmenting the update area image R. More specifically, for example, when the transfer period t for the image data of the update area image R is greater than the threshold X, the segmenting unit 507 determines the segmentation unit such that the transfer period t for image data of a partial area image r segmented from the update area image R is the threshold X or less.

As described, the threshold X is a value representing the response period elapsing from the user operation input until a response is returned for the operation input. The threshold X, for example, is set to a value such that when the response period exceeds the threshold X, an unpleasant emotion may be elicited in the user. The threshold X is stored, for example, in a storage apparatus such as the memory 302, the magnetic disk 305, and the like.

The segmenting unit 507 has a function of segmenting the update area image R by the determined segmentation unit to thereby generate image data for each partial area image r into which the update area image R is segmented. More specifically, for example, the segmenting unit 507 vertically or horizontally segments the update area image R by the determined segmentation unit and thereby, generates image data for each partial area image r.

The transmitting unit 508 has a function of transmitting in a given sequence to the client apparatus 202, the image data for each partial area image r into which the update area image R is segmented. More specifically, for example, the transmitting unit 508 compresses (encodes) the image data of a partial area image r by the selected compression scheme to transmit the compressed image data of the partial area image r as still image data to the client apparatus 202.

More specifically, for example, when the update area image R is divided and segmented forming columns, the transmitting unit 508 may transmit the image data of the partial area images r to the client apparatus 202, sequentially from the left side of the update area image R. Further, for example, when the update area image R is divided and segmented forming rows, the transmitting unit 508 may transmit the image data of the partial area images r to the client apparatus 202, sequentially from the top of the update area image R.

Further, among the partial area images into which the update area image R is segmented, the transmitting unit 508 may transmit first to the client apparatus 202, the image data of the partial area image r that includes the mouse pointer. The partial area image r, for example, can be identified from information indicating the position of the mouse pointer and included in the operation information.

Further, among the partial area images into which the update area image R is segmented, the transmitting unit 508 may transmit first to the client apparatus 202, the image data of the partial area image r that includes a center point of the display screen S.

An example of a transmission sequence of the image data of the partial area images r into which the update area image R is segmented will be described hereinafter with reference to FIGS. 7 to 10.

Further, if the update area image R has not been segmented, the transmitting unit 508 transmits the image data of the update area image R to the client apparatus 202. More specifically, for example, the transmitting unit 508 compresses (encodes) the image data of the update area image R by the selected compression scheme to transmit the compressed image data of the update area image R as still image data or moving picture data to the client apparatus 202.

Among the image data of the partial area images $r_{pre}$ into which the update area image $R_{pre}$ of the image $P_{pre}$ is segmented, unsent image data that is of a partial area image $r_{pre}$ and that has not be transmitted to the client apparatus 202 may be present. In this case, in place of the unsent image data of the partial area image $r_{pre}$, the transmitting unit 508 may transmit to the client apparatus 202, the image data of a partial area image r segmented from the update area image R.

Further, the generating unit 503 may judge whether the image data of the update area image R is still image data. More specifically, for example, the generating unit 503 may judge whether the image data of image data of the update area image R is still image data, based on identification information identifying whether the image data of the image P is still image data or moving picture data.

The transmitting unit 508 may transmit the image data of the update area image R to the client apparatus 202, when the image data of the update area image R is moving picture data. As a result, in the case of moving picture data having high segmenting overhead and for which the image P is frequently updated, the update area image R of the image P can be transmitted to the client apparatus 202 without segmenting. In other words, the transfer volume calculating unit 504 calculates the data transfer volume T based on the image data of the update area image R and the compression rate c only when the image data of the update area image R is still image data.

The server 201 has a function of compressing data of a portion in which movement is great between frames into data of a compression scheme for moving pictures and transmitting the compressed data to the client apparatus 202. More specifically, for example, the server 201 notifies the application of the operation information, segments the obtained image into plural areas, and monitors the frequency of variation for each resulting area. The server 201 may handle an area for which the frequency of variation exceeds a threshold as a moving picture area.

In this case, the generating unit 503, for example, may determine whether the image data of the update area image R is still image data according to whether the update area image R includes a moving picture area. More specifically, for example, when the update area image R includes a moving picture area, the generating unit 503, for example, determines the image data of the update area image R to be moving picture data. Concerning a technique of compressing data of a portion for which movement is great between frames into data of a compression scheme for moving pictures and transmitting the compressed data to the client apparatus 202, for example, Japanese Laid-Open Patent Publication No. 2011-238014 can be referred to.

FIG. 6 is a block diagram depicting an example of a functional configuration of the client apparatus 202. In FIG. 6, the client apparatus 202 includes an obtaining unit 601, a transmitting unit 602, a receiving unit 603, and a display control unit 604. The obtaining unit 601 to the display control unit 604 are functions forming a control unit. More specifically, for example, the functions are realized by executing on the CPU 401, programs stored in a storage apparatus such as the ROM 402, the RAM 403 and the magnetic disk 405 depicted in FIG. 4, or by the I/F 406. Processing results of the functional units, for example, are stored to a storage apparatus such as the RAM 403, the magnetic disk 405, and the like.

The obtaining unit 601 has a function of obtaining operation information that indicates user operation input. More specifically, for example, the obtaining unit 601 receives operation input by the user, via the keyboard 408 (refer to FIG. 4) on the display screen S and/or the mouse 409 (refer to FIG. 4) to thereby obtain the operation information indicating the user operation input.

As described, operation information includes, for example, information that indicates the type of operation input, such as clicks, double clicks, drag & drops, etc., the position of the mouse pointer when the operation input is performed, and completion of the operation input. When operation input such as drag & drop is performed continuously, the obtaining unit 601 may obtain at a constant time interval, the operation information indicating the user operation input.

If the keyboard 408 is a touch panel, operation input such as tapping, dragging, flicking, pinching out and pinching in may be performed using the keyboard 408. In this case, the obtaining unit 601 may obtain, for example, operation information that is touch panel-type keyboard 408 operation input that has been converted into mouse operation input that can be interpreted by an application under execution by the server 201. However, conversion processing of the operation information may be performed on the server 201 side.

The transmitting unit 602 has a function of transmitting to the server 201, the operation information obtained by the obtaining unit 601. More specifically, for example, each time operation information is obtained by the obtaining unit 601, the transmitting unit 602 transmits the obtained operation information to the server 201.

The receiving unit 603 has a function of receiving image data from the server 201. More specifically, for example, the receiving unit 603 receives from the server 201, the image P, the update area image R included in the image P, and the image data of the partial area image r segmented from the update area image R.

The display control unit 604 has a function of controlling the display 407, and displaying image data SD received by the receiving unit 603. More specifically, for example, the display control unit 604 decodes and displays at a corresponding position of the display screen S, the received image P, the update area image R, and the image data of the partial area image r.

The transmitting unit 602 may transmit to the server 201, the reception time of given data received by the receiving unit 603. The given data, as described above, is data for measuring the data transfer rate K at the server 201.

An example of display in the desktop screen displayed on the display 407 of the client apparatus 202 will be described. First, a case will be described where the update area image R is segmented into rows, and the image data of the partial area images r into which the update area image R is segmented is transmitted to the client apparatus 202 sequentially from the top position.

Figure 7:
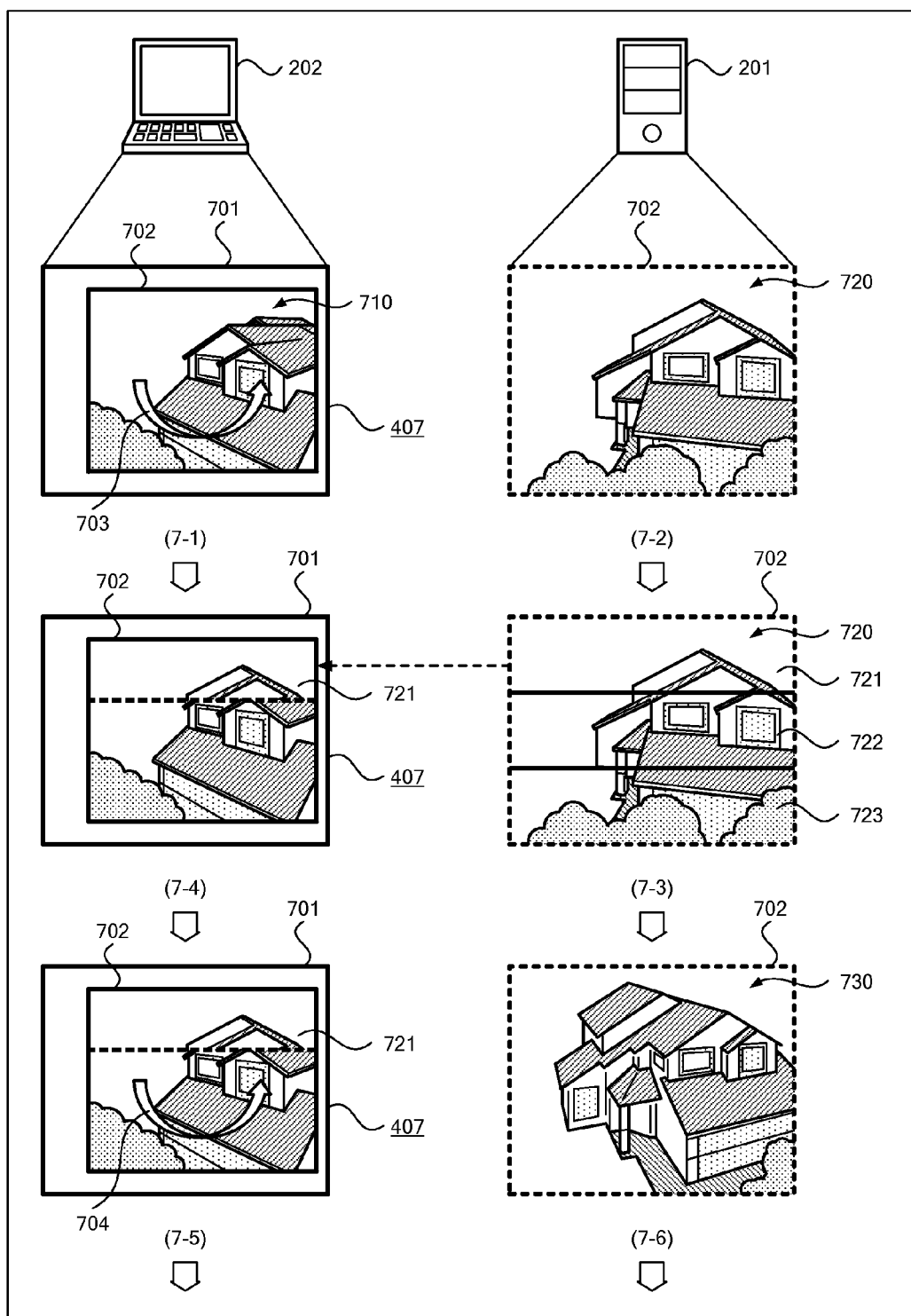
FIGS. 7 and 8 are diagrams depicting a first display example of a desktop screen.
Figure 8:
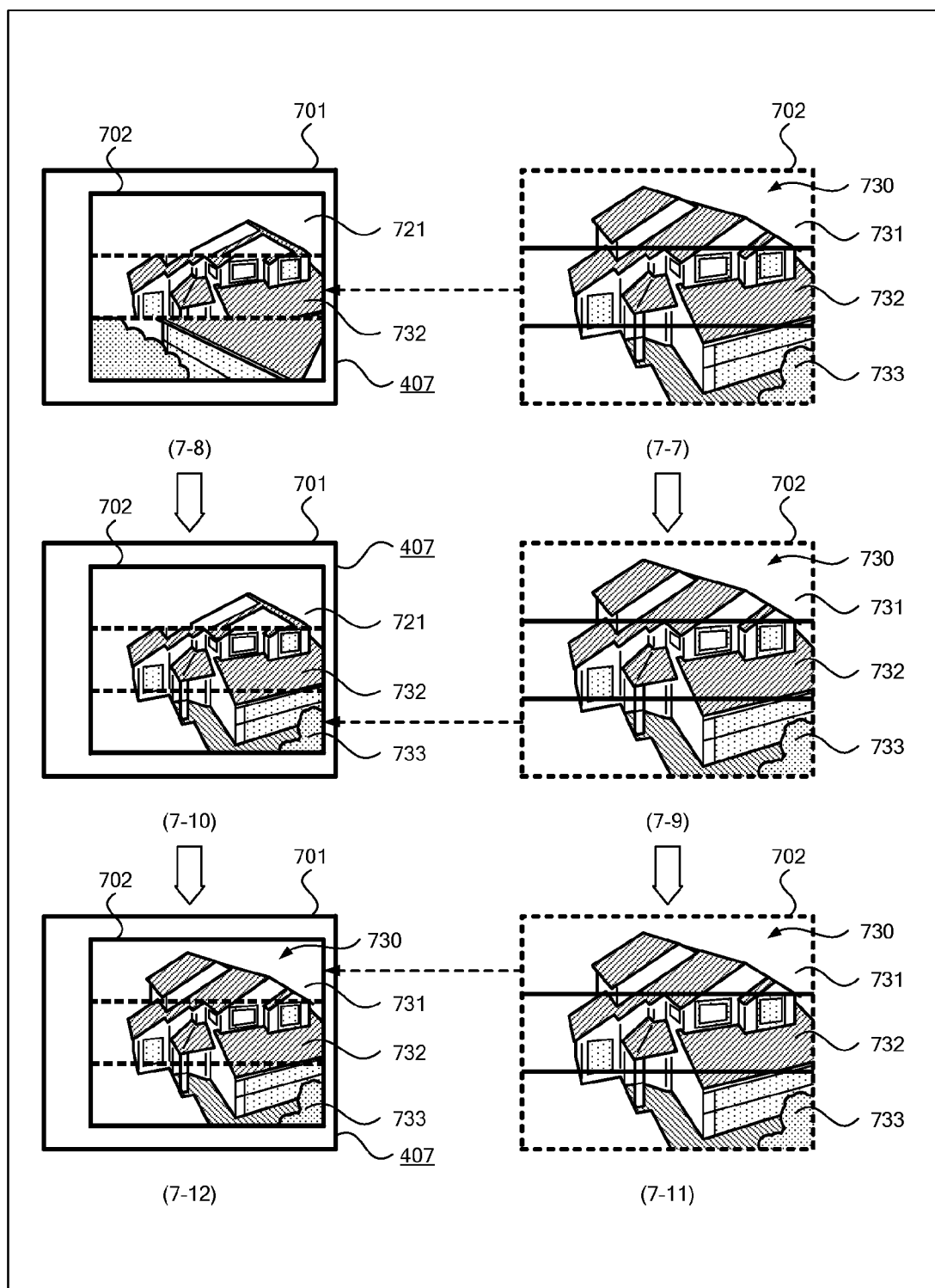

FIGS. 7 and 8 are diagrams depicting a first display example of the desktop screen. In FIG. 7, a desktop screen 701 is displayed on the display 407 of the client apparatus 202. Further, in the desktop screen 701, a window 702 is displayed, and in the window 702, an image 710 is displayed.

Here, consequent to operation input at the client apparatus 202, to rotate as indicated by an arrow 703, the image 710 displayed in the window 702 (refer to (7-1) in FIG. 7), an image 720 to be displayed next in the window 702 is assumed to be obtained at the server 201 (refer to (7-2) in FIG. 7). Further, the update area image R of the image 720 is regarded as all of the areas of the image 720, and the update area image R is assumed to be segmented into partial area images 721 to 723 (refer to (7-3) in FIG. 7).

In this case, first, the server 201 transmits to the client apparatus 202, the image data of the partial area image 721, among the partial area images 721 to 723. The client apparatus 202 displays the partial area image 721 at a corresponding position in the window 702, based on the image data of the partial area image 721 (refer to (7-4) in FIG. 7).

Here, consequent to operation input at the client apparatus 202, to rotate as indicated by an arrow 704, the image 710 displayed in the window 702 and for which a portion has been updated (refer to (7-5) in FIG. 7), an image 730 to be displayed next in the window 702 is assumed to be obtained at the server 201 (refer to (7-6) in FIG. 7). Further, the update area image R of the image 730 is regarded as all of the areas of the image 730, and the update area image R is assumed to be segmented into the partial area images 731 to 733 (refer to (7-7) in FIG. 8).

In this case, the server 201 transmits to the client apparatus 202, the image data of the partial area image 732, in place of the partial area image 722. As a result, the client apparatus 202 displays the partial area image 732 at a corresponding position in the window 702, based on the image data of the partial area image 732 (refer to (7-8) in FIG. 8).

Subsequently, the server 201 transmits to the client apparatus 202, the unsent image data of the partial area image 733, among the partial area images 731 to 733 (refer to (7-9) in FIG. 8). As a result, the client apparatus 202 displays the partial area image 733 at a corresponding position in the window 702, based on the image data of the partial area image 733 (refer to (7-10) in FIG. 8).

The server 201 then transmits to the client apparatus 202, the unsent image data of the partial area image 731, among the partial area images 731 to 733 (refer to (7-11) in FIG. 8. As a result, the client apparatus 202 displays the partial area image 731 at a corresponding position in the window 702, based on the image data of the partial area image 731 (refer to (7-12) in FIG. 8. Consequently, the entire screen of the window 702 is updated and the image 730 is displayed in the window 702.

Thus, the server 201 enables the display contents of the window 702 to be updated in parts sooner than updating the display contents by units of window. As a result, the user can predict how the display contents of the window 702 will change with respect to the operation input performed by the user, making it easier to judge whether new operation input has to be performed.

The server 201 further enables the image data of the partial area images r into which the update area image R is segmented to be transmitted to the client apparatus 202 in a predetermined sequence. As a result, the user can easily know which portion of the window 702 will be updated next. Further, the server 201 enables the image data of the partial area image r segmented from the next update area image R to be transmitted to the client apparatus 202 in place of unsent image data, in a case where a subsequent operation input has been performed while unsent image data of a partial image area remains.

A case will be described where the update area image R is segmented into rows, and among the partial area images r into which the update area image R is segmented, the image data of the partial area image r that includes the mouse pointer is first transmitted to the client apparatus 202.

Figure 9:
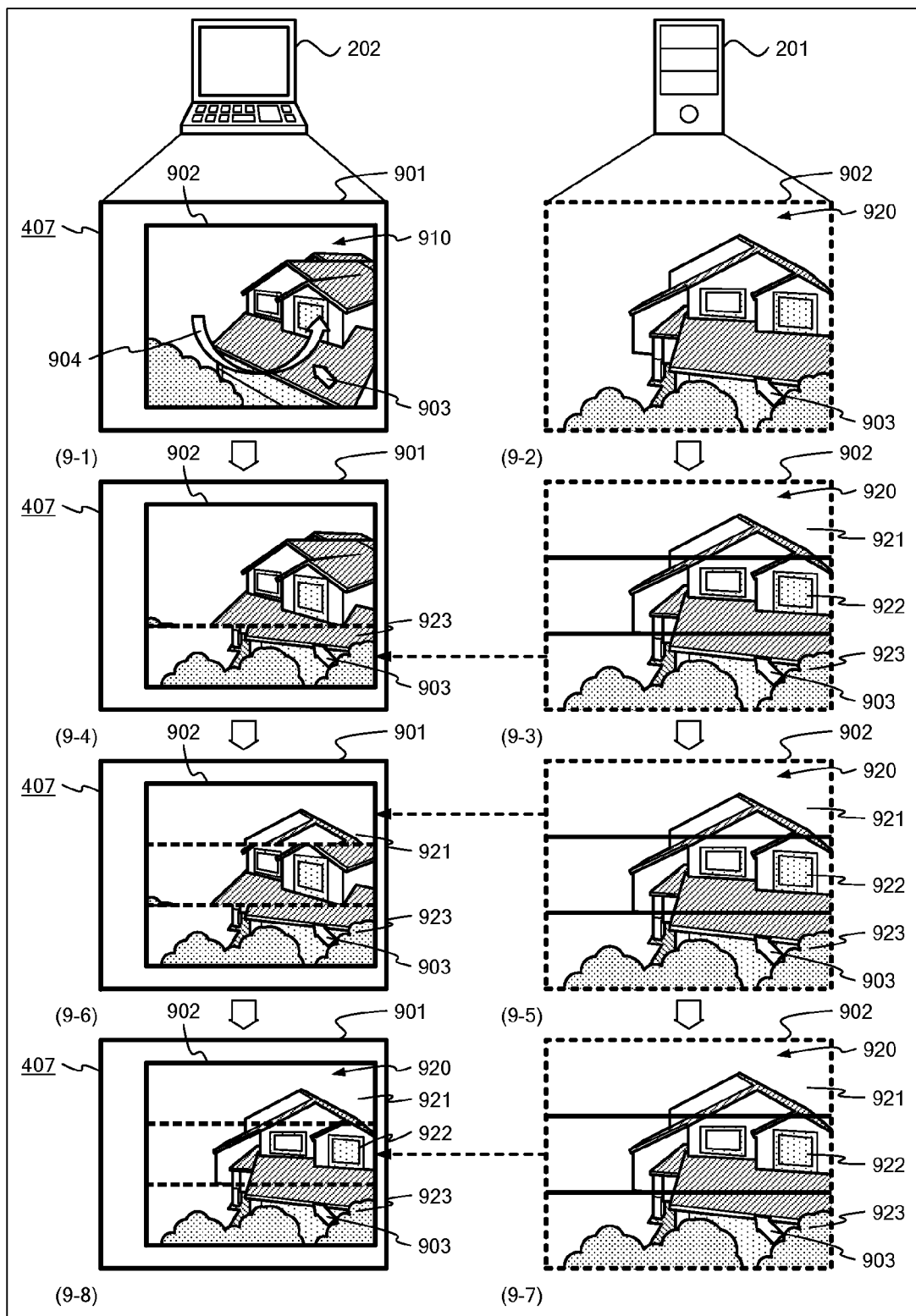
FIG. 9 is a diagram depicting a second display example of the desktop screen.

FIG. 9 is a diagram depicting a second display example of the desktop screen. In FIG. 9, a desktop screen 901 is displayed on the display 407 of the client apparatus 202. Further, in the desktop screen 901, a window 902 is displayed, and in the window 902, an image 910 and a mouse cursor 903 are displayed.

Here, consequent to operation input at the client apparatus 202, to rotate as indicated by arrow 904, the image 910 depicted in the window 902 (refer to (9-1) in FIG. 9), an image 920 to be displayed next in the window 902 is assumed to be obtained at the server 201 (refer to (9-2) in FIG. 9). Further, the update area image R of the image 920 is assumed to be all of the areas of the image 920, and the update area image R is assumed to be segmented into partial area images 921 to 923 (refer to (9-3) in FIG. 9).

In this case, first, the server 201 identifies the partial area image 923 that includes the mouse cursor 903 (mouse pointer), among the partial area images 921 to 923. The server 201 transmits to the client apparatus 202, the image data of the partial area image 923 that includes the mouse cursor 903 (mouse pointer). The client apparatus 202 displays the partial area image 923 at a corresponding position in the window 902, based on the image data of the partial area image 923 (refer to (9-4) in FIG. 9).

Subsequently, the server 201 transmits to the client apparatus 202, the unsent image data of the partial area image 921, among the partial area images 921 to 923 (refer to (9-5) in FIG. 9. As a result, the client apparatus 202 displays the partial area image 921 at a corresponding position in the window 902, based on the image data of the partial area image 921 (refer to (9-6) in FIG. 9).

Subsequently, the server 201 transmits to the client apparatus 202, the unsent image data of the partial area image 922, among the partial area images 921 to 923 (refer to (9-7) in FIG. 9. As a result, the client apparatus 202 displays the partial area image 922 at a corresponding position in the window 902, based on the image data of the partial area image 922 (refer to (9-8) in FIG. 9).

Thus, among the partial area images 921 to 923 into which the update area image R is segmented, the server 201 enables the image data of the partial area image 923 that includes the mouse cursor 903 to be transmitted first to the client apparatus 202. As a result, in the window 902, the portion that includes the mouse cursor 903 is updated first, whereby the user easily knows which portion of the window 902 will be updated next.

A case will be described where the update area image R is segmented into rows, and among the partial area images r into which the update area image R is segmented, the image data of the partial area image r that includes a center point of the update area image R is transmitted first to the client apparatus 202.

Figure 10:
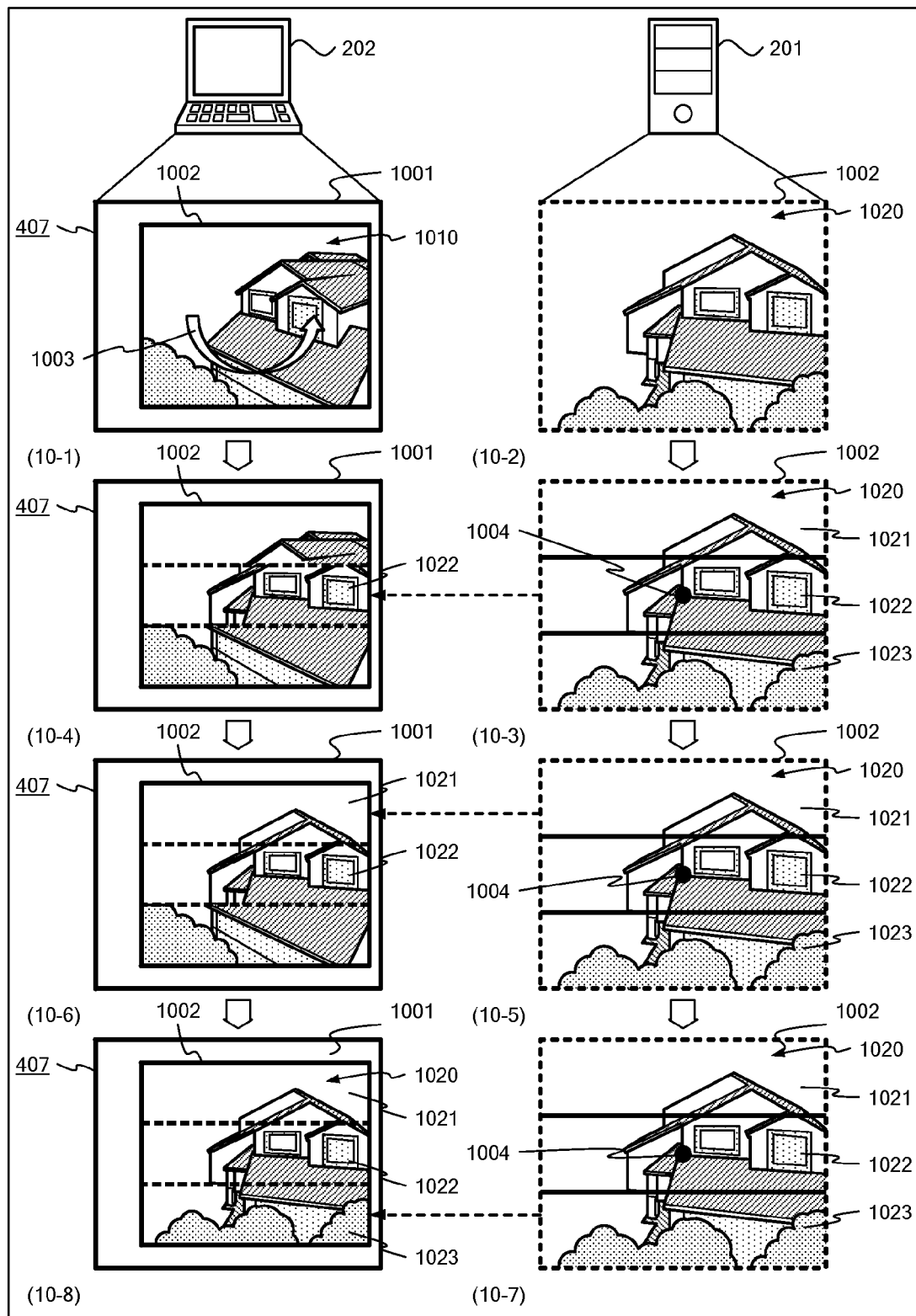
FIG. 10 is a diagram depicting a third display example of the desktop screen.

FIG. 10 is a diagram depicting a third display example of the desktop screen. In FIG. 10, a desktop screen 1001 is displayed on the display 407 of the client apparatus 202. Further, in the desktop screen 1001, a window 1002 is displayed, and in the window 1002, an image 1010 is displayed.

Here, consequent to operation input at the client apparatus 202, to rotate as indicated by arrow 1003, the image 1010 displayed in the window 1002 (refer to (10-1) in FIG. 10), an image 1020 to be displayed next in the window 1002 is assumed to be obtained at the server 201 (refer to (10-2) in FIG. 10). Further, the update area image R of the image 1020 is assumed to be all of the areas of the image 1020, and the update area image R is assumed to be segmented into partial area images 1021 to 1023 (refer to (10-3) in FIG. 10).

In this case, first, the server 201 identifies among the partial area images 1021 to 1023, the partial area image 1022 that includes a center point 1004 of the window 1002. The server 201 transmits to the client apparatus 202, the image data of the partial area image 1022 that includes the center point 1004. The client apparatus 202 displays the partial area image 1022 at a corresponding position in the window 1002, based on the image data of the partial area image 1022 (refer to (10-4) in FIG. 10).

Subsequently, the server 201 transmits to the client apparatus 202, the unsent image data of the partial area image 1021, among the partial area images 1021 to 1023 (refer to (10-5) in FIG. 10). As a result, the client apparatus 202 displays the partial area image 1021 at a correspond position in the window 1002, based on the image data of the partial area image 1021 (refer to (10-6) in FIG. 10).

Subsequently, the server 201 transmits to the client apparatus 202, the unsent image data of the partial area image 1023, among the partial area images 1021 to 1023 (refer to (10-7) in FIG. 10). As a result, the client apparatus 202 displays the partial area image 1023 at a corresponding position in the window 1002, based on the image data of the partial area image 1023 (refer to (10-8) in FIG. 10).

Thus, among the partial area images 1021 to 1023 into which the update area image R is segmented, the server 201 enables the image data of the partial area image 1022 that includes the center point 1004 of the window 1002 to be transmitted first to the client apparatus 202. As a result, in the window 1002, the portion that includes the center point 1004 is updated first, whereby the user easily know which portion of the window 1002 will be updated next.

A procedure of a display process of the client apparatus 202 will be described.

Figure 11:
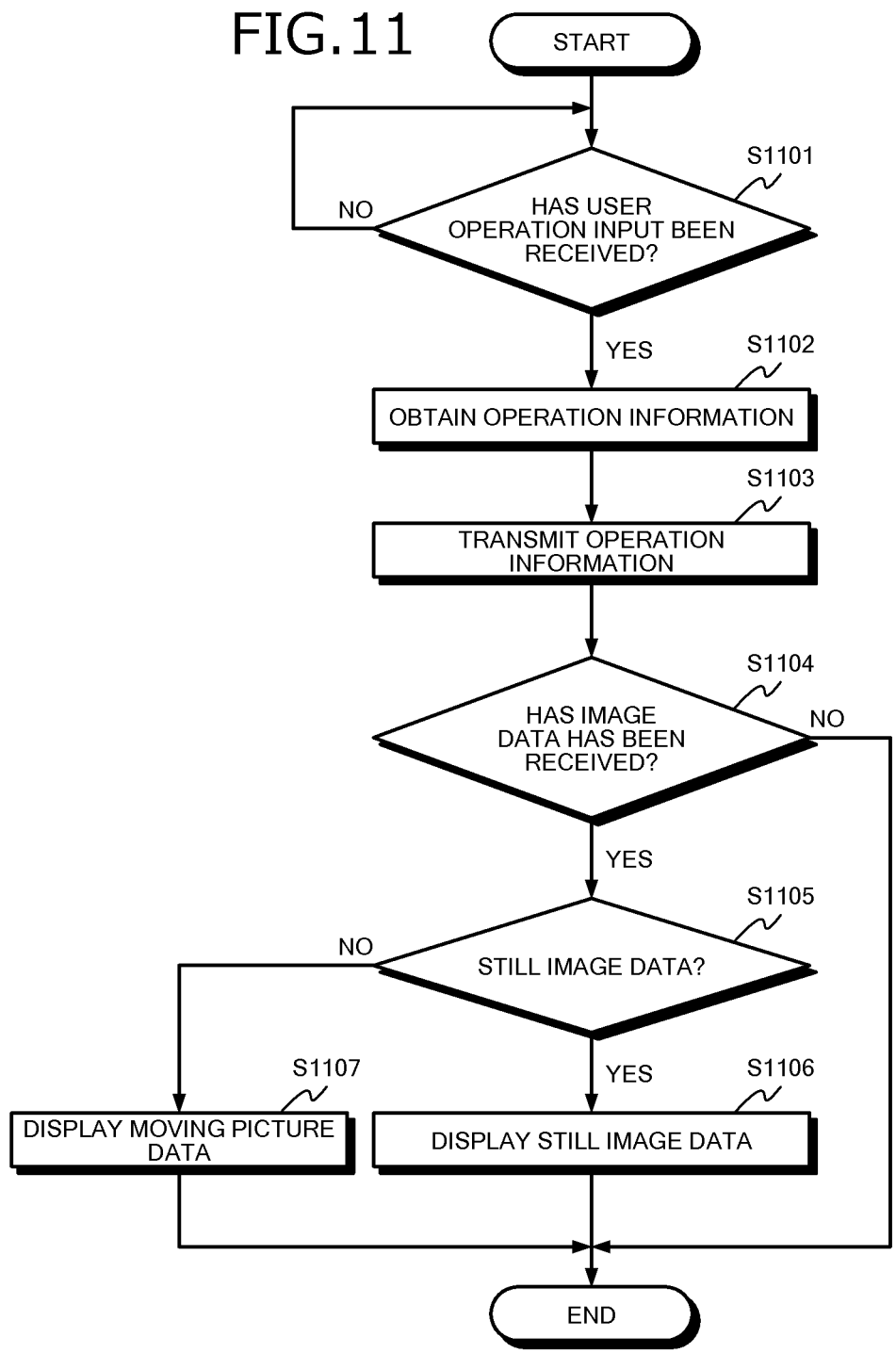
FIG. 11 is a flowchart of an example of a procedure of a display process by the client apparatus 202.

FIG. 11 is a flowchart of an example of a procedure of a display process by the client apparatus 202. In the flowchart depicted in FIG. 11, the client apparatus 202 judges whether user operation input has been received (step S1101). If user operation has not been received, the client apparatus 202 waits for user operation input to be received (step S1101: NO).

When user operation input has been received (step S1101: YES), the client apparatus 202 obtains operation information that indicates the user operation input (step S1102). The client apparatus 202 transmits the obtained operation information to the server 201 (step S1103).

The client apparatus 202 judges whether image data has been received from the server 201 (step S1104). If no image data has been received from the server 201 (step S1104: NO), the client apparatus 202 ends the series of operations according to the flowchart.

On the other hand, if image data has been received from the server 201 (step S1104: YES), the client apparatus 202 judges whether the received image data is still image data (step S1105).

If the received image data is still image data (step S1105: YES), the client apparatus 202 displays on the display screen S, still image data that is obtained by decoding the received image data using a restoration scheme for still images (step S1106), and ends the series of operations according to the flowchart.

Meanwhile, in the case of moving picture data (step S1105: NO), the client apparatus 202 displays on the display screen S, moving picture data that is obtained by decoding the received image data using a restoration scheme for moving pictures (step S1107), and ends the series of operations according to the flowchart. As a result, the display contents of the display screen S can be updated in response to user operation input.

A procedure of image processing by the server 201 will be described.

Figure 12:
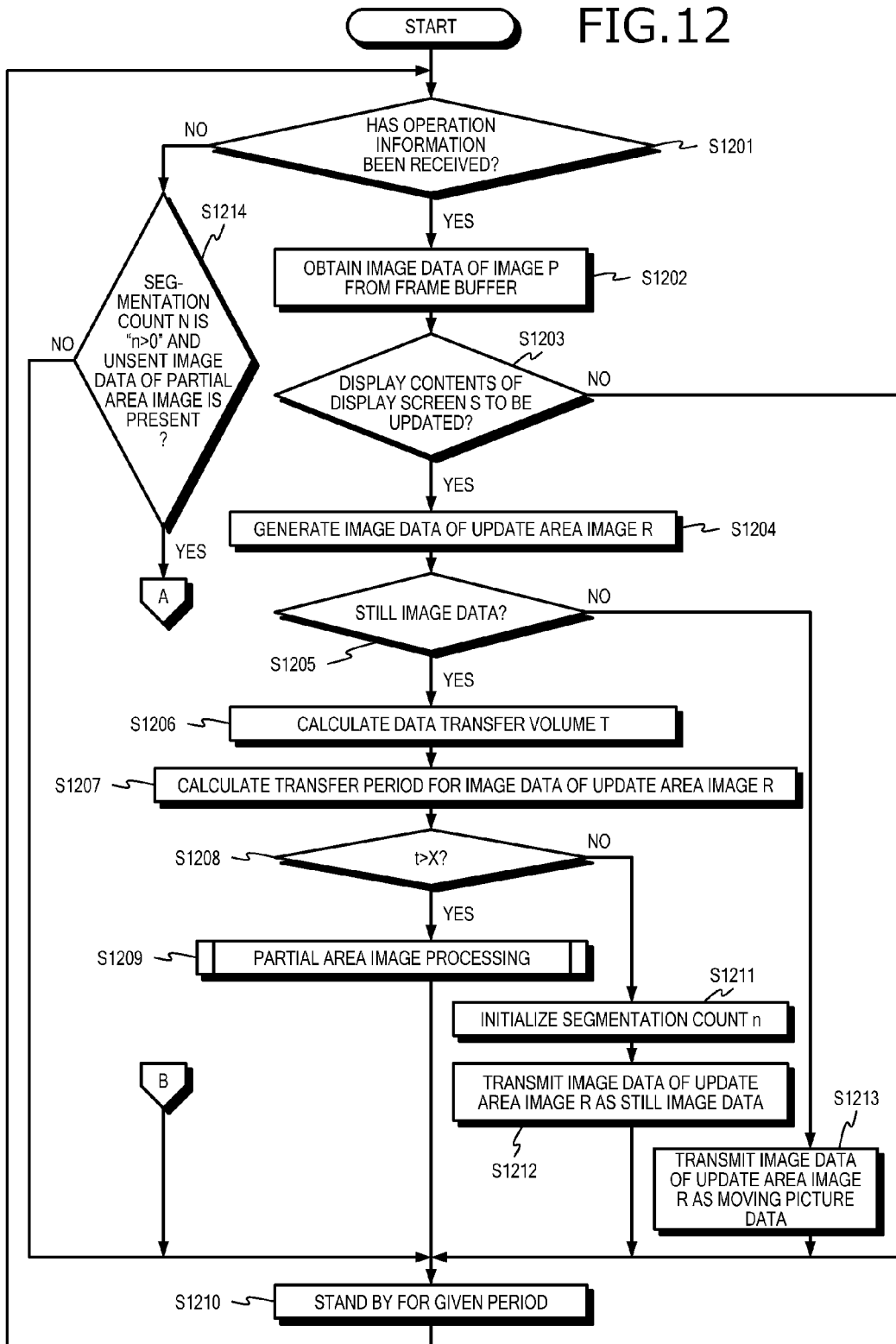
FIG. 12 is a flowchart depicting an example of a procedure of image processing by the server 201.

FIG. 12 is a flowchart depicting an example of a procedure of image processing by the server 201. In the flowchart depicted in FIG. 12, the server 201 judges whether operation information has been received from the client apparatus 202 (step S1201).

If operation information has been received from the client apparatus 202 (step S1201: YES), the server 201 in response to a request from the client apparatus 202, notifies the application under execution of the operation information and thereby, obtains image data of the image P from the frame buffer (step S1202).

The server 201 judges based on the image data of the image P and the image data the image $P_{pre}$, whether the display contents of the display screen S are to be updated (step S1203). If the display contents of the display screen S are not to be updated (step S1203: NO), the server 201 transitions to step S1210.

On the other hand, if the display contents of the display screen S are to be updated (step S1203: YES), the server 201 generates image data of the update area image R of the image P (step S1204), and judges whether the generated image data of the update area image R is still image data (step S1205).

If the image data of the update area image R is still image data (step S1205: YES), the server 201 calculates based on the image data of the update area image R and the compression rate c of the image data of the update area image R, the data transfer volume T to be transmitted to the client apparatus 202 (step S1206).

The server 201 divides the calculated data transfer volume T by the data transfer rate K and thereby, calculates the transfer period t for the image data of the update area image R (step S1207). The server 201 judges whether the transfer period t calculated for the image data of the update area image R is greater than the threshold X (step S1208).

If the transfer period t for the image data of the update area image R is greater than the threshold X (step S1208: YES), the server 201 executes partial area image processing (step S1209). A procedure of the partial area image processing will be described hereinafter with reference to FIG. 13. The server 201 stands by for a given period (for example, 30 [msec]) (step S1210), and returns to step S1201.

Further, at step S1208, if the transfer period t for the image data of the update area image R is the threshold X or less (step S1208: NO), the server 201 initializes a segmentation count n as "n=0" (step S1211). The server 201 transmits the image data of the update area image R as still image data to the client apparatus 202 (step S1212), and transitions to step S1210.

At step S1205, if the image data of the update area image R is moving picture data (step S1205: NO), the server 201 transmits the image data of the update area image R as moving picture data to the client apparatus 202 (step S1213), and transitions to step S1210.

At step S1201, if no operation information has been received from the client apparatus 202 (step S1201: NO), the server 201 judges whether the segmentation count n is "n>0" and unsent image data of a partial area image is present (step S1214).

If "n>0" is true and unsent image data of a partial area image is present (step S1214: YES), the server 201 transitions to step S1304 depicted in FIG. 13. On the other hand, if "n=0" is not true, or no unsent image data of a partial area image is present (step S1214: NO), the server 201 transitions to step S1210.

A procedure of the partial area image processing at step S1209 depicted in FIG. 12 will be described.

FIG. 13 is a flowchart depicting a procedure of the partial area image processing. In the flowchart depicted in FIG. 13, the server 201 determines the segmentation unit such that the transfer period t for image data of a partial area image r segmented from the update area image R becomes the threshold X or less (step S1301).

The server 201 segments the update area image R by the determined segmentation unit and thereby, generates image data of each partial area image into which the update area image R is segmented (step S1302). The server 201 sets the segmentation count n into which the update area image R has been segmented (step S1303).

The server 201 selects the image data of an unselected partial area image that has not been selected from among the partial area images into which the update area image R has been segmented (step S1304). The server 201 judges based on the selected image data of the partial area image, whether the partial area image includes an update portion (step S1305).

If the partial area image includes no update portion (step S1305: NO), the server 201 transitions to step S1210 depicted in FIG. 12. On the other hand, if the partial area image includes an update portion (step S1305: YES), the server 201 transmits the image data of the partial area image as still image data to the client apparatus 202 (step S1306), and returns to the step that called the partial area image processing.

As a result, the image data of the partial area images r into which the update area image R is segmented can be transmitted to the client apparatus 202 such that the updating interval at which the display contents of the display screen S are updated at the client apparatus 202 does not exceed the threshold X.

As described, the server 201 according to the embodiment enables the data transfer volume T to be calculated based on the image data of the update area image R displayed on the display screen S of the client apparatus 202 and the compression rate c of the image data. Further, the server 201 enables the transfer period t for the image data of the update area image R to be calculated based on the data transfer volume T and the data transfer rate K. The server 201 further enables the segmentation unit by which the update area image R is segmented to be calculated based on the transfer period t for the image data of the update area image R.

As a result, the segmentation unit of the update area image R to be displayed on the display screen 110 of the terminal apparatus 102 can be changed dynamically according to the data transfer rate K representing the performance of the network, and the data transfer volume T transmitted to the terminal apparatus 102.

The server 201 enables the segmentation unit to be determined such that when the transfer period t for the image data of the update area image R exceeds the threshold X, the transfer period t for the image data of a partial area image r into which the update area image R is segmented becomes the threshold X or less. The server 201 further enables the image data of the partial area images r into which the update area image R is segmented by the determined segmentation unit to be sequentially transmitted to the client apparatus 202 in a given sequence.

As a result, the image data of the partial area images r can be sequentially displayed on the display screen S such that the updating interval at which the display contents of the display screen S are updated at the client apparatus 202 does not exceed the threshold X. As a result, response to user operation input is sooner, enabling drops in user operability to be prevented. Further, the server 201 enables the response period to be adjusted by varying the threshold X.

The server 201 enables the data transfer rate K to be calculated based on the transmission time when given data is transmitted to the client apparatus 202, the reception time when the given data is received by the client apparatus 202, and the data volume of the given data. As a result, the fluctuating traffic volume dependent performance of the network 210 can be measured.

The server 201, when unsent image data of the partial area image $r_{pre}$ is present and a new screen update is performed, enables the image data of the partial area image r to be transmitted to the client apparatus 202 in place of the unsent image data of the partial area image $r_{pre}$. As a result, the transmission of image data for a screen update corresponding to a past operation input is terminated, enabling increases in the traffic volume of the network 210 to be prevented.

Thus, the thin client system 200 according to the embodiment enables the display contents of the display screen S to be partially updated at an updating interval that does not elicit an unpleasant emotion in the user. As a result, response to user operation input is sooner, improving the operational feel and the user can predict how the display contents of the display screen S are going to change in response to operation input, enabling operability to be improved.

For example, when the client apparatus 202 is used to operate an application in a mobile environment in which the communication state is unstable, the data volume of data transfer occurring each time, for example, object rotation is repeatedly performed can be reduced. Further, even if communication is temporarily lost, the display contents of the display screen S are updated in parts, enabling the instability of the communication to be hidden from the user.

The image processing method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to the embodiments, an effect is achieved in that drops in user operability can be prevented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A system comprising:
   an information processing apparatus and a terminal apparatus connected via a network, wherein
   the information processing apparatus includes a processor that calculates based on image data of an image to be displayed on a display screen of the terminal apparatus and a compression rate of the image data, a data transfer volume to be transmitted to the terminal apparatus, and determines based on the calculated data transfer volume and a data transfer rate with the terminal apparatus, a segmentation unit by which the image is segmented,
   the processor of the information processing apparatus calculates based on the data transfer volume and the data transfer rate, a transfer period for the image data, and when the calculated transfer period for the image data is greater than a threshold, determines the segmentation unit such that a transfer period for image data of a partial area into which the image is segmented is the threshold or less, and
   the processor of the information processing apparatus transmits to the terminal apparatus in a given sequence, the image data of each partial area image into which the image is segmented by the determined segmentation unit.

2. The system according to claim 1, wherein
   the processor of the information processing apparatus:
   receives from the terminal apparatus, operation information indicating operation input performed at the terminal apparatus,
   gives notification of the received operation information to an application under execution, to obtain the image data of the image, and
   calculates the data transfer volume, based on the obtained image data of the image and the compression rate of the image data.

3. The system according to claim 2, wherein
   the processor of the information processing apparatus:
   generates based on image data of a first image obtained by notifying the application of the operation information and image data of a second image obtained by notifying the application of previous operation information received from the terminal apparatus just before the operation information, image data of an image representing an update area in the first image, and
   calculates the data transfer volume based on the generated image data of the image and a compression rate of the generated image data.

4. The system according to claim 3, wherein
   the processor of the information processing apparatus:
   calculates the data transfer rate based on a transmission time when data is transmitted to the terminal apparatus, a reception time when the data is received by the terminal apparatus, and a data volume of the data, and calculates a transfer period for the image data of the image, based on the calculated data transfer volume and the calculated data transfer rate.

5. The system according to claim 4, wherein
   when among image data of partial area images into which an image representing an update area in the second image is segmented, unsent image data is present that is of a partial area image and that has not been transmitted to the terminal apparatus, in place of the unsent image data, the processor of the information processing apparatus transmits to the terminal apparatus, the image data of the partial area image into which the image is segmented.

6. The system according to claim 5, wherein
   the processor of the information processing apparatus calculates the data transfer volume based on the image data of the image and the compression rate of the image data, when the image data of the image is still image data.

7. The system according to claim 6, wherein
   the processor of the information processing apparatus transmits to the terminal apparatus, the image data of the image, when the image data of the image is still image data.

8. An information processing apparatus that is connected to a terminal apparatus, via a network, the information processing apparatus comprising:
   a processor that calculates based on image data of an image to be displayed on a display screen of the terminal apparatus and a compression rate of the image data, a data transfer volume transmitted to the terminal apparatus, and determines based on the calculated data transfer volume and a data transfer rate with the terminal apparatus, a segmentation unit by which the image is segmented, wherein
   the processor of the information processing apparatus calculates based on the data transfer volume and the data transfer rate, a transfer period for the image data, and when the calculated transfer period for the image data is greater than a threshold, determines the segmentation unit such that a transfer period for image data of a partial area into which the image is segmented is the threshold or less, and
   the processor of the information processing apparatus transmits to the terminal apparatus in a given sequence, the image data of each partial area image into which the image is segmented by the determined segmentation unit.

9. An image processing method executed by an information processing apparatus connected to a terminal apparatus, via a network, the image processing method comprising:
   calculating based on image data of an image to be displayed on a display screen of the terminal apparatus and a compression rate of the image data, a data transfer volume transmitted to the terminal apparatus; and
   determining based on the calculated data transfer volume and a data transfer rate with the terminal apparatus, a segmentation unit by which the image is segmented, wherein
   the calculating is based on the data transfer volume and the data transfer rate, a transfer period for the image data, and when the calculated transfer period for the image data is greater than a threshold, determining the segmentation unit such that a transfer period for image data of a partial area into which the image is segmented is the threshold or less, and transmitting to the terminal apparatus in a given sequence, the image data of each partial area image into which the image is segmented by the determining.

\* \* \* \* \*